May 16, 1967  K. H. MACHER  3,320,014
FOUR COMPONENT AFOCAL FRONT ATTACHMENT FOR CAMERA OBJECTIVES
Filed July 18, 1963
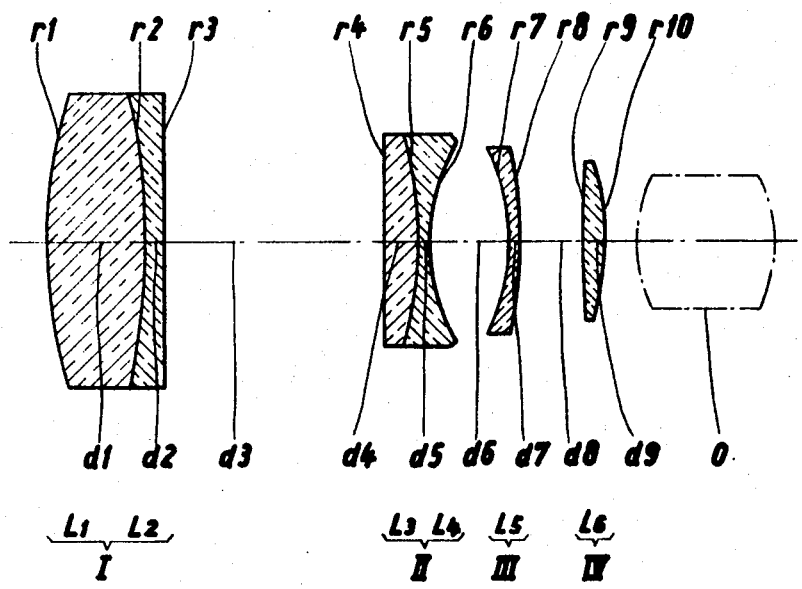
KARL H. MACHER
Inventor:
AGENT

United States Patent Office 3,320,014
Patented May 16, 1967

3,320,014
FOUR COMPONENT AFOCAL FRONT ATTACHMENT FOR CAMERA OBJECTIVES
Karl H. Macher, Bad Kreuznach, Rhineland, Germany, assignor to Jos. Schneider & Co. Optische Werke, Bad Kreuznach, Rhineland, Germany, a corporation of Germany
Filed July 18, 1963, Ser. No. 296,035
Claims priority, application Germany, July 27, 1962, Sch 31,807
1 Claim. (Cl. 350—184)

My present invention relates to a substantially afocal lens assembly adapted to be used as an adjustable front attachment for photographic or cinematographic optical objectives in order to enable a selective variation of their image scale without changing the overall focal length.

It is an object of this invention to provide an assembly of the character described which, while consisting of only a small number of components of limited total axial length, gives good optical performance over an extended range of magnification.

A more specific object of my invention is to provide an attachment of this type which satisfies the aforestated requirements throughout a range of adjustment corresponding to a ratio of about 3:1 between the maximum and the minimum magnification obtainable therewith.

It is also an object of the present invention to provide, in such an attachment, means for enabling focusing displacement of one of its members—from infinity to a closeup distance of preferably about 1 meter—with full definition throughout the entire field in each position of adjustment.

The foregoing objects are realized, in accordance with my instant invention, by the provision of a lens assembly consisting of four air-spaced components, including two substantially fixed positive components bracketing two axially shiftable negative components, in which the last (fixed) component is a biconvex lens with a rear surface curved substantially more strongly than its front surface and in which the two intermediate, negative components have confronting concave surfaces of approximately like curvature defining a substantially symmetrically biconvex space between them. More specifically, the radius of curvature of the rear surface of the last component, preferably a singlet, should have an absolute value less than about a third that of its front surface while being preferably equal to at least a fifth thereof; by "approximately like curvature" with reference to the confronting surfaces of the two negative components is meant that their radii of curvature should depart by not more than about 20 to 25% from each other, i.e. the radius of the front face of the third component (preferably a meniscus-shaped singlet) should range in absolute length within about 0.8 and 1.2 times the length of the radius of the rear face of the second component (preferably a nearly plano-concave doublet with a collective cemented surface). By "substantially fixed" I wish to imply that one of the fixed components, generally the first one, may be limitedly adjustable in axial direction for focusing purposes; this first component is advantageously a nearly plano-convex doublet with a forwardly facing convexity and with a dispersive cemented surface.

With a system of this description there is achieved a nearly complete suppression of the usual deficiencies, such as spherical aberration, astigmatism and coma, in all positions of adjustment. I have found, moreover, that chromatic aberrations can be largely eliminated by so dimensioning the cemented surfaces of the first and second components that the radius of curvature of the second one of these surfaces ranges within substantially 0.5 and 0.8 times the length of the radius of the first cemented surface, both these radii being of negative sign.

The sole figure of the accompanying drawing shows an embodiment of my invention positioned in front of a conventional fixed-focus camera objective as a removable attachment thereof.

Preceding the objective O, which may be an integral part of a camera not shown, is a four-component system including a limitedly movable first component I of positive refractivity, an axially shiftable second component II of negative refractivity, a similarly displaceable third component III also of negative refractivity, and a positively refracting fixed rear component IV.

Component I is a doublet consisting of a biconvex lens L1 of lower refractive index, having radii $r1$, $r2$ and thickness $d1$, cemented onto an almost plano-concave lens L2 of higher refractive index, having radii $r2$, $r3$ and thickness $d2$. Component II, separated from component I by an air space $d3$, is a doublet consisting of an almost plano-convex lens L3 (radii $r4$, $r5$ and thickness $d4$), of relatively elevated index of refractivity, cemented on to a less highly refractive biconcave lens L4 (radii $r5$, $r6$ and thickness $d5$). Component III, which with component II defines a nearly symmetrically biconvex air space $d6$, is a meniscus-shaped singlet with a more strongly curved forward face, having radii $r7$, $r8$ and thickness $d7$. Component IV, following lens L5 with a spacing $d8$, is a biconvex singlet with a larger radius of curvature $r9$, a smaller radius of curvature $r10$ and an axial thickness $d9$. The air spaces $d3$, $d6$ and $d8$ are, of course, variable by the displacement of components II and III.

The following Table A lists a typical set of parameters for a system as shown in the figure, designed for a range of lateral magnification from 0.6 to 1.85. The associated objective O may, for example, have a relative aperture of 1:1.8 and a focal length equal to 13 units of length (e.g., millimeters), the numerical values of the radii $r1$ to $r10$ and the thicknesses and separations $d1$ to $d9$ being given in the same units. Also listed are the refractive indices $n_d$ and the Abbé numbers $\nu$ of lenses L1 to L6.

TABLE A

| Lens | | Radii | Thicknesses and Separations | $n_d$ | $\nu$ |
|---|---|---|---|---|---|
| I | L1 | $r1 = +46.20$ | $d1=9.50$ | 1.61772 | 49.78 |
| | L2 | $r2 = -64.83$ | $d2=1.50$ | 1.75520 | 27.53 |
| | | $r3 = -700.00$ | $d3=20.57$ | Variable air space | |
| II | L3 | $r4 = -1487.50$ | $d4=3.40$ | 1.72830 | 28.66 |
| | L4 | $r5 = -36.19$ | $d5=1.00$ | 1.62041 | 60.29 |
| | | $r6 = +18.09$ | $d6=7.12$ | Variable air space | |
| III | L5 | $r7 = -18.63$ | $d7=1.00$ | 1.62364 | 36.75 |
| | | $r8 = -46.78$ | $d8=5.91$ | Variable air space | |
| IV | L6 | $r9 = +100.04$ | $d9=2.00$ | 1.51821 | 65.18 |
| | | $r10 = -26.27$ | | | |
| | | | $d_{total}=52.00$ | | |

The position of the lens members shown in the drawing and the numerical values given for the variable air spaces $d3$, $d6$, $d8$ correspond to an adjustment of the system to an intermediate magnification $\beta=1.2$. Other operative positions, respectively corresponding to the minimum and maximum values of $\beta$, are defined by the magnitudes of these air spaces as given in Table B below:

TABLE B

| $d3$ | $d6$ | $d8$ | $\beta$ |
|---|---|---|---|
| 0.45 | 26.15 | 7.00 | 0.6 |
| 30.88 | 2.06 | 0.66 | 1.85 |

As will be noted from Table A, the system disclosed therein satisfies the conditions (a) $3|r10|=78.81<|r9|=100.04$
(b) $0.8|r6|=14.47<|r7|=18.63<1.2|r6|=21.71$ and
(c) $0.5|r2|=32.41<|r5|=36.19<0.8|r2|=51.86$ specified hereinbefore.

I claim:

An optical lens system adapted to be used as a substantially afocal front attachment for camera objectives, consisting of four air-spaced components including a substantially fixed positively refracting first component consisting of a biconvex first lens and a nearly plano-concave second lens cemented together along a forwardly concave dispersive surface, an axially shiftable negatively refracting second component consisting of a nearly plano-convex third lens and a biconcave fourth lens cemented together along a forwardly concave collective surface of greater power than said dispersive surface, an axially shiftable negatively refracting third component in the form of a meniscus-shaped fifth lens with a more strongly curved forward face, and a fixed positively refracting fourth component in the form of a biconvex sixth lens with a more strongly curved rear face, said second and third components being movable into a first position of minimum magnification, a second position of intermediate magnification and a third position of maximum magnification; relative numerical values of the radii $r1$ to $r10$ and of the thicknesses and separations $d1$ to $d9$ of said first, second, third, fourth, fifth and sixth lenses L1 to L6, their refractive indices $n_d$ and their Abbé numbers $\nu$ being, in said second position substantially as given in the following table:

| Lens | | Radii | Thicknesses and Separations | $n_d$ | $\nu$ |
|---|---|---|---|---|---|
| I | L1 | $r1 =+46.20$ | $d1=9.50$ | 1.61772 | 49.78 |
| | L2 | $r2 =-64.83$ | $d2=1.50$ | 1.75520 | 27.53 |
| | | $r3 =-700.00$ | $d3=20.57$ | Air space | |
| II | L3 | $r4 =-1487.50$ | $d4=3.40$ | 1.72830 | 28.66 |
| | L4 | $r5 =-36.19$ | $d5=1.00$ | 1.62041 | 60.29 |
| | | $r6 =+18.09$ | $d6=7.12$ | Air space | |
| III | L5 | $r7 =-18.63$ | $d7=1.00$ | 1.62364 | 36.75 |
| | | $r8 =-46.78$ | $d8=5.91$ | Air space | |
| IV | L6 | $r9 =+100.04$ | $d9=2.00$ | 1.51821 | 65.18 |
| | | $r10=-26.27$ | | | |
| | | | $d_{total}=52.00$ | | |

References Cited by the Examiner

UNITED STATES PATENTS 2,746,350  5/1956  Hopkins _____ 88—57

FOREIGN PATENTS 1,292,894  3/1962  France.
1,308,216  9/1962  France.

JEWELL H. PEDERSEN, *Primary Examiner.*

JOHN K. CORBIN, *Examiner.*